(12) United States Patent
Sanchez et al.

(10) Patent No.: US 6,981,158 B1
(45) Date of Patent: Dec. 27, 2005

(54) METHOD AND APPARATUS FOR TRACING PACKETS

(75) Inventors: Luis Sanchez, Mayaguez, PR (US); William Timothy Strayer, West Newton, MA (US); Craig Partridge, Lansing, MI (US)

(73) Assignee: BBNT Solutions LLC, Cambridge, MA (US)

( * ) Notice: Subject to any disclaimer, the term of this patent is extended or adjusted under 35 U.S.C. 154(b) by 912 days.

(21) Appl. No.: 09/881,074

(22) Filed: Jun. 14, 2001

Related U.S. Application Data
(60) Provisional application No. 60/212,425, filed on Jun. 19, 2000.

(51) Int. Cl.[7] ............................ G06F 11/30; G06F 15/00
(52) U.S. Cl. ........................ 713/201; 713/200; 702/188
(58) Field of Search ................................ 713/200, 201; 702/188

(56) References Cited

U.S. PATENT DOCUMENTS

| | | | | |
|---|---|---|---|---|
| 6,154,879 | A | * 11/2000 | Pare et al. | 705/35 |
| 6,311,273 | B1 | * 10/2001 | Helbig et al. | 713/200 |
| 6,356,859 | B1 | * 3/2002 | Talbot et al. | 702/188 |
| 2004/0103315 | A1 | * 5/2004 | Cooper et al. | 713/201 |

OTHER PUBLICATIONS

Stefan Savage, David Wetherall, Anna Karlin and Tom Anderson, Practical Network Support for IP Traceback, Proc. ACM Sigcomm 2000, Stockholm, Sweden, Aug. 2000, 12 pages.

Beverly Schwartz, Alden W. Jackson, W. Timothy Strayer, Wenyi Zhou, R. Dennis Rockwell and Craig Partridge, Smart Packets: Applying Active Networks to Network Management, ACM Trans. On Computer Systems, vol. 18, No. 1, Feb. 2000, pp. 67–88.

* cited by examiner

*Primary Examiner*—Norman M. Wright
(74) *Attorney, Agent, or Firm*—Ropes & Gray LLP (57) ABSTRACT

A system and method for performing source path isolation in a network. The system comprises an intrusion detection system (IDS), a source path isolation server (SS1) and at least one router configured to operate as a source path isolation router (SR1) operating within an autonomous system. When IDS detects a malicious packet, a message is sent to SS1. SS1 in turn generates a query message (QM) containing at least a portion of the malicious packet. Then, QM is sent to participating routers located one hop away. SR1 uses the query message to determine if it has observed the malicious packet by comparing it with locally stored information about packets having passed through SR1. SR1 sends a reply to SS1, and SS1 uses the reply to identify the ingress point into the network of the malicious packet.

34 Claims, 6 Drawing Sheets

Target ID:
Time:
Source:

| NODE ID | LINK | NODE RESPONSE | NODE TIME | TRANS- FORMED | STATUS |
|---|---|---|---|---|---|
| 01 | 001 | YES | 01:00:40.000 | NO | OFF |
| 02 | 002 | YES | 01:00:40.200 | NO | OFF |
| 03 | 003 | NO | | | ON |
| 04 | 004 | YES | 01:00:41.000 | YES | OFF |
| 04 | 004 | YES | 01:00:41.005 | YES | OFF |
| ● | --- | --- | --- | --- | --- |
| ● | --- | --- | --- | --- | --- |
| ● | --- | --- | --- | --- | --- |
| . | --- | --- | --- | --- | --- |
| n | 006 | NO | | | ON |

METHOD AND APPARATUS FOR TRACING PACKETS

CROSS REFERENCE TO RELATED APPLICATIONS

The instant application claims priority from provisional application Ser. No. 60/212,425, filed Jun. 19, 2000, which is hereby incorporated by reference herein in its entirety. The instant application is also related to U.S. patent application Ser. No. 09/881,145, having assignee in common with the instant application and filed Jun. 14, 2001, entitled METHOD AND APPARATUS FOR IDENTIFYING A PACKET, the contents of which are hereby incorporated by reference in its entirety.

BACKGROUND OF THE INVENTION

1. Field of the Invention

The present invention relates generally to the field of network security and more specifically to using low overhead methods for identifying the intrusion location of a packet in a network.

2. Description of Prior Art

Availability of low cost computers, high speed networking products, and readily available network connections has helped fuel proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with rapid growth of the Internet have come problems caused by malicious individuals or pranksters launching attacks from within the network. As the size of the Internet continues to grow, so does the threat posed by these individuals.

The ever-increasing number of computers, routers and connections making up the Internet increases the number of vulnerability points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch. Such a computer or device can be compromised and configured to place malicious packets onto the network.

The most publicized forms of network attacks often involve placing thousands or millions of packets onto the network using a practice known as flooding. The flood of packets can be targeted to a specific device on the network, for example a corporate web site, thus causing the device to become overwhelmed and shutdown. Alternatively, an attack may be designed to clog the links, or connection points, between network components. Network attacks can be further enhanced using a practice known as spoofing. Spoofing involves associating bogus Internet Protocol (IP) addresses with transmitted packets, thus making the packets' origins impossible to determine based upon looking only at a received packet. Spoofing can be further enhanced using a technique referred to as transformation. When a packet is transformed, it undergoes a process that changes the original packet into a new packet, as, for example, would happen during tunneling or network address translation (NAT). Locating the origin of a network attack is further complicated because coordinated attacks can be employed. In a coordinated attack, multiple network devices are compromised and then used to launch a distributed attack. A distributed attack is one that is launched essentially simultaneously from several locations within the network.

Network attacks can also be launched using a single packet. While single packet attacks are not as well publicized as multi-packet attacks, they are becoming more common and they are capable of inflicting significant damage to vulnerable networks. At present, it is extremely difficult to detect single packet attacks in a timely manner using known methods of intrusion detection, which exacerbates the challenge in dealing with them. As a result, network data, currently, must be analyzed after the fact to determine if a single packet attack was the source of disruption. Any tracing of the single packet to its origins, in accordance with prior art techniques, must also take place after the attacking packet traversed the network.

Much of the difficulty in identifying the origin of an attack arises because the Internet employs a stateless routing infrastructure, in that it is one in which routing is based solely on destination addresses. Although source IP addresses may be transmitted with data, they are easy to forge, and as a result they are untrustworthy. A forged source address may bear no similarity to the actual source address from which the packet came. As a result, most prior art techniques and devices for preventing network attacks attempt to stop delivery of malicious packets at the ultimate destination device rather than attempting to locate their origin. Such origin is referred to as an entry point, also referred to as an ingress point or intrusion location, onto the network. Failing to identify the source address of malicious packets inhibits preventing further attacks, and such failure makes identification of the actual perpetrator difficult.

Figure 1:
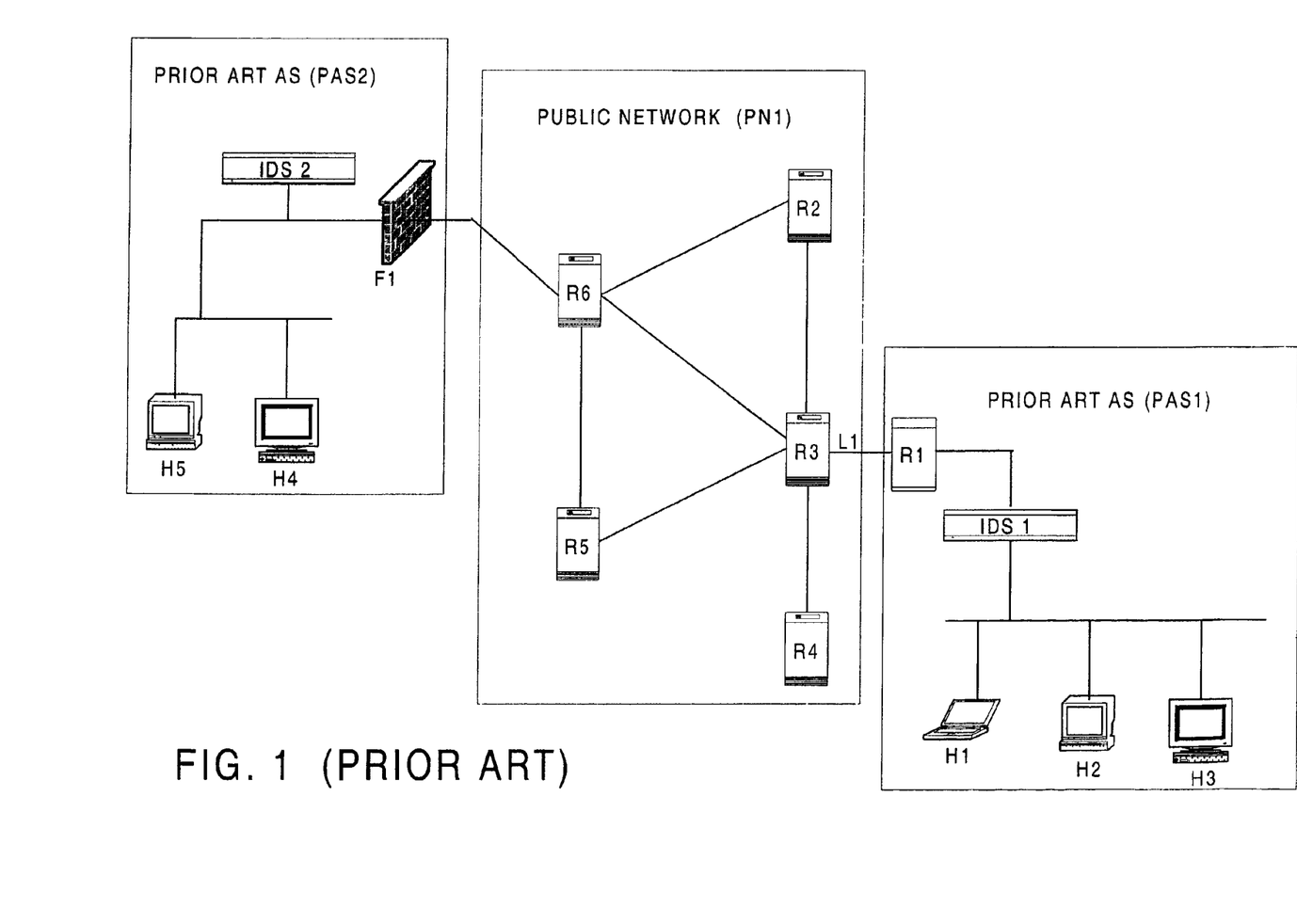
FIG. 1 is a block diagram of a prior art network comprising autonomous systems.

FIG. 1

FIG. 1 provides an example of a network employing prior art devices to thwart malicious packets. Two prior art autonomous systems are shown, PAS1 and PAS2, respectively, connected to the Internet, or public network (PN1) shown comprised of routers R2–R6. An autonomous system (AS) is a network domain in which all routers in the AS can exchange routing tables. Often the AS may be a local area network (LAN) such as one found at a university, municipality, large corporation, or Internet Service Provider (ISP). An AS may further be comprised of computers, or hosts, connected to the AS such as H1–H3 for PAS1 or H4–H5 for PAS2, respectively. An AS is normally connected to the public network by one or more border routers, here R1 (for PAS1) or a firewall Ft (for PAS2) incorporating router functionality.

Border routers contain routing tables for other routers within the AS and for routers within the public network that are connected to the AS by a link, i.e. a communicative connection. In FIG. 1, R1 is a border router for PAS1 and it connects to the Internet using representative link L1. Routing tables act as road maps for routers on the network, in that they are used to ensure that network traffic is forwarded through the appropriate links in route to a desired destination address.

Firewalls are typically installed between a local area network (LAN), or intranet, and the Internet, or public network. Firewalls act as gatekeepers for an AS in that they allow certain packets in while excluding other packets.

Firewalls may be implemented in routers or servers connected between an AS and the Internet, or they may function as standalone devices. Rule sets are used by firewalls to determine which packets will be allowed into their respective AS and which packets will be discarded. Since rules determine which packets get through the firewalls, only packets known to be problematic can be stopped. Therefore, rule sets must be updated on a regular basis to provide protection against new threat characteristics.

Additional protection for an AS may be obtained by supplementing border routers and firewalls with intrusion detection systems (IDSs). IDSs also use rule-based algorithms to determine if a given pattern of network traffic is abnormal. The general premise used by an IDS is that malicious network traffic will have a different pattern from normal, or legitimate, network traffic. Using a rule set, an IDS monitors inbound traffic to an AS. When a suspicious pattern or event is detected, the IDS may take remedial action, or it can instruct a border router or firewall to modify operation to address the malicious traffic pattern. For example, remedial actions may include disabling the link carrying malicious traffic, discarding packets coming from a particular source address, or discarding packets addressed to a particular destination. In FIG. 1, IDS1 is used to protect PAS1 and IDS2 is used in conjunction with F1 to protect PAS2.

Although border routers, firewalls, and IDSs can be used to help prevent known packets from entering an AS, they are not well equipped for stopping unknown packets because they rely on rule-based look up tables containing signatures of known threats. In addition, border routers, firewalls, and IDSs generally are not well equipped for identifying the origin, or ingress location, of malicious packets, particularly when spoofing is employed. Even when spoofing is not used, the above-noted devices may not be able to determine the ingress point for packets because packets often traverse many Internet links and devices, such as routers, bridges, and switches, before arriving at an AS. Reliably tracing the path of a packet often requires information about each link traversed by a packet. To obtain this information, routing data must remain with the packet or, alternatively, each router, or device, on the path must store information about, or a copy of, each packet traversing a network. With high-speed routers passing gigabits of data per second, storing full copies of packets is not practical.

What has been needed and what has not been available is a method for identifying the origin of malicious packets that can be implemented in an AS on the Internet and which addresses all shortcomings of prior art protection techniques. Embodiments of the present invention offer welcome solutions to these prior art protection problems.

SUMMARY OF THE INVENTION

Embodiments of the present invention employ apparatus, system, computer program product and/or method for identifying an intrusion point of a malicious or target packet into a network. More specifically, in a network including multiple hosts and multiple routers for facilitating transmission of packets on a network, a system, for example, is employed for determining the point of entry of a malicious packet. An intrusion detection system detects the entry of a malicious packet in the network. A source path isolation server responsive to the intrusion detection system isolates the malicious packet and thereby determines the point of entry of the malicious packet. In a further embodiment of the system, the source path isolation server includes a means for generating a query message containing information about the malicious packet and a means for forwarding the query message to some of the routers located one hop away. In still a further embodiment of the system, certain of the routers include means for generating a hash value of the identification information about the malicious packet, a means for establishing a bit map of hash values representative of packets having passed through the respective router, and a means for comparing the hash value of the identification information to the hash values of packets having passes through the respective router.

In a further aspect of the invention, in a network carrying a plurality of packets where at least one of the packets is a target packet, the network includes at least one network component, a detection device and a server, a technique for determining the point of entry of a target packet into the network. The target packet is received from the detection device at the server. A query message is sent to a first one of the network components where the query message identifies the target packet. A reply containing information about the target packet from the first network component is received. The reply is processed to extract information contained therein. And, the information is used in a manner that allows the entry point of the target packet to ultimately be determined.

In yet a further aspect of the invention, in a network carrying a plurality of packets, a computer-readable data signal is embodied in a transmission medium used to identify an intrusion location of a target packet. The network includes a server and a network component having a memory storing representations of the plurality of packets, namely the data signal. A header portion includes an address of the network component. And, a body portion includes at least a portion of the target packet, the body portion being compared to corresponding representations where a match between a portion of the target packet and one of the representations indicates that the network component encountered the target packet.

In still a further aspect of the invention, in a network carrying a plurality of packets, the network includes a network component having a memory storing first information about a subset of the plurality of packets having passed through the network component. The network component further includes a processor for computing a first hash value of a target packet and a second hash value of a member of the subset of the plurality of packets. The memory also stores second information about an intrusion location of the target packet in the network. A data structure stored in the memory includes information resident in a database used by a source path isolation program for determining the intrusion location with the data structure. A network component identification attribute corresponds to a location of the network component. A target packet attribute uniquely identifies the target packet. And, a reply packet attribute associated with at least one of the members and being associated with the network component identification attribute identifies the origin of the reply packet with the reply packet indicating that the member was encountered if the first hash value matches the second hash value.

It is advantageous to employ embodiments of the present invention to protect data networks. A further advantage of the invention is the elimination of problems caused by undetected malicious packets in a network. A still further advantage of the invention is that it detects malicious packets without requiring special purpose network equipment. Furthermore, the present invention communicates information about malicious packets to other network devices thus enhancing network security. Another advantage of the invention is that it efficiently uses stored information about packets to facilitate detecting malicious packets.

It is thus a general object of the present invention to provide improved packet networks.

It is another object of the present invention to eliminate problems caused by malicious packets in a network.

It is a further object of the present invention to identify malicious packets to facilitate identifying their intrusion locations into the network.

It is a further object of the present invention to quickly identify ingress points of malicious packets when distributed attacks are launched against a network.

It is yet a further object of the present invention to efficiently use stored information about packets traversing a link in a network.

Further objects and advantages of the present invention will become more apparent after reference to the detailed description of exemplary embodiments thereof taken in conjunction with the accompanying drawings in which:

DETAILED DESCRIPTION OF PREFERRED EMBODIMENT

Figure 2:
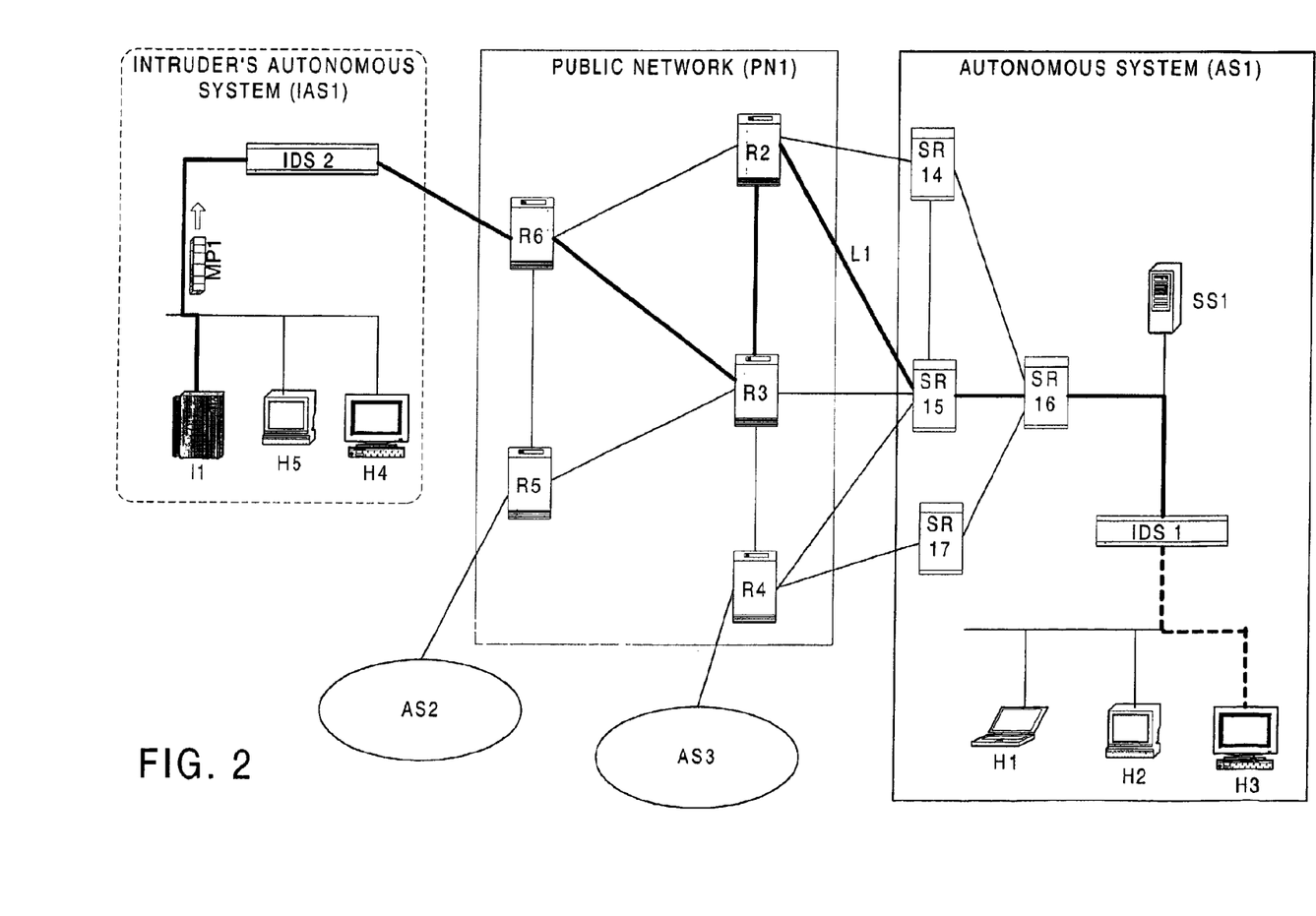
FIG. 2 is a block diagram of an exemplary embodiment of the present invention operating in conjunction with an Internet network.

FIG. 2

A preferred embodiment uses a server and one or more specially configured network components, or devices, such as a router, within an autonomous system (AS) to determine the ingress point, or location, for a malicious packet (MP1). FIG. 2 illustrates an embodiment that may be used with an Internet Protocol network. More particularly, FIG. 2 is broken into three general areas enclosed within borders with communication media, such as links, carrying data traffic across the network, connecting the general areas. Links serve as a transmission media for data and signals on the network and may be comprised of wire, optical fiber, radio frequency (RF) transponders, or the like.

The rightmost portion of FIG. 2 denotes an AS, shown as AS1, enhanced by the addition of a source path isolation server (SS1) and network components, here routers, modified to work as source path isolation routers (SRs), denoted by SR14–17, respectively. Also included within AS1 is a detection device, here an intrusion detection system (IDS) denoted as IDS1, and host computers H1–H3. IDS1 may take the form of a commercially available IDS, or alternatively it may be developed specifically for participating in source path isolation systems and methods. IDSs and firewalls are well known in the art and will not be described in detail herein. An informative source of information on IDS and firewall functionality that may be used with the disclosed embodiments can be found in *Firewalls and Internet Security: Repelling the Wily Hacker*, by William R. Cheswick and Steven M. Bellowin, Addison-Wesley (1994).

SS1 may be comprised of a general-purpose computer, or server, operatively coupled to the network of AS1 and executing machine-readable code enabling it to perform source path isolation in conjunction with SR14–17 and IDS1. While SS1 and IDS1 are shown as separate devices in FIG. 2, it is noted that they can be combined into a single unit performing both intrusion detection and source path isolation. SR14–17 may be comprised of commercially available routers, or similar devices such as switches, bridges or the like, employing software and hardware enabling them to participate in source path isolation.

The central portion of FIG. 2 represents the public network, shown as PN1, carrying traffic between the autonomous systems, namely IAS1, and AS1, AS2 and AS3. PN1 comprises routers R2–R6, links operatively coupling the routers making up PN1, and links attaching to ASs coupled to PN1. PN1 may also comprise computers external to an AS (not shown). In the foregoing discussion, routers that have not been modified to act as source path isolation routers (SRs) are denoted as Rx, such as those located in PN1, where x is a number such as 2, 3, 4, etc.

The lower portion of FIG. 2 includes other autonomous systems, AS2 and AS3 that may be operatively connected to PN1. AS2 and AS3 may employ source path isolation apparatus and methods, or alternatively, they may be prior art autonomous systems (PAS).

The leftmost portion of FIG. 2 shows an autonomous system (IAS1) used by an intruder to launch an attack on AS1. IAS1 contains an IDS, shown as IDS2, operatively coupled to three host computers H4, H5 and I1 using links. In FIG. 2, I1 has been configured such that it places a malicious packet (MP1) onto IAS1 for transmission to AS1 via PN1. While FIG. 2 illustrates a computer configured to place MP1 onto the network, routers, switches, gateways and other hardware capable of placing machine-readable data onto a network may be used in place of or in conjunction with such computer. When a device has been configured to inject an MP1 onto a network, it is referred to as an intruder or intruding device.

To launch an attack, an intruder generates malicious data traffic and places it onto a link for transmission to one or more destination devices having respective destination addresses. In FIG. 2, the heavy lines are used to indicate the path taken by MP1, namely I1 to IDS2, IDS2-R6, R6-R3, R3-R2, R2-SR15, SR15-SR16, and SR16-IDS1 (where hyphenation implies operative coupling between network components). The thick dashed link from IDS1-H3 denotes the intended path to the targeted device H3.

Detection and source path isolation of MP1 may be accomplished as follows. Detection device, here IDS1, identifies MP1 using known methods. After detecting MP1, IDS1 generates a notification packet, or triggering event, and sends it to SS1 thus notifying SS1 that a malicious packet has been detected within AS1. The notification packet may include MP1 or portions thereof along with other information useful for SS1 to begin source path isolation. Examples of information that may be sent from IDS1 to SS1 along with MP1 are time-of-arrival, encapsulation information, link information, and the like. When MP1 (or fraction thereof) has been identified and forwarded to SS1 it is referred to as a target packet (TP1) because it becomes the target of the source path isolation method further described herein.

SS1 may then generate a query message (QM1) containing TP1, a portion thereof, or a representation of TP1 such as a hash value. After generating QM1 containing identification information about TP1, SS1 sends it to some, or all, participating routers. Accordingly, SS1 may send QM1 to participating routers located one hop away; however the disclosed invention is not limited to single hops. For example, SR16 is one hop away from SS1, whereas SR14, SR15 and SR17 are two hops away from SS1 and one hop away from SR16, respectively. When SR16 receives QM1 from SS1, SR16 determines if TP1 has been seen. This determination is made by comparing TP1 with a database containing signatures of other characteristics representative of packets having passed through SR16. Typically, SR16 is considered to have observed, or encountered, a packet when the packet is passed from one of its input ports to one of its output ports such as would be done when SR16 forwards during normal operation within a network.

To determine if a packet has been observed, SR16 first stores a representation of each packet it forwards. Then SR16 compares the stored representation to the information about TP1 contained in QM1. Typically, a representation of a packet passed through SR16 will not be a copy of the entire packet, but rather it will be comprised of a portion of the packet or some unique value representative of the packet. Since modern routers can pass gigabits of data per second, storing complete packets is not practical because memories become prohibitively large. In contrast, storing a value representative of the contents of a packet uses memory in a more efficient manner. By way of example, if incoming packets range in size from 256 bits to 1000 bits, a fixed width number may be computed across the bits making up a packet in a manner that allows the entire packet to be uniquely identified. A hash value, or hash digest, is an example of such a fixed width number. To further illustrate the use of representations, if a 32-bit hash digest is computed across each packet, then the digest may be stored in memory or, alternatively, the digest may be used as an index, or address, into memory. Using the digest, or an index derived therefrom, results in efficient use of memory while still allowing identification of each packet passing through a router. The disclosed invention works with any storage scheme that saves information about each packet in a space efficient fashion, that can definitively determine if a packet has not been observed, and that will respond positively (i.e. in a predictable way) when a packet has been observed. Although the invention works with virtually any technique for deriving representations of packets, for brevity, the remaining discussion will use hash digests as exemplary representations of packets having passed through a participating router.

Returning to the discussion of FIG. 2, if SR16 has not observed TP1, it may so inform SS1. But if SR16 has a hash matching TP1, it may send a response to SS1 indicating that the packet was observed by, or at, SR16. In addition, SR16 may forward QM1 to adjacent routers 1 hop away. In FIG. 2, SR16 sends QM1 to SR14, SR15 and SR17. Then, SR14, 15 and 17 determine if they have seen TP1 and notify SS1 accordingly. In this fashion, the query message/reply process is forwarded to virtually all SRs within an AS on a hop-by-hop basis.

In FIG. 2, routers SR14, SR15 and SR17 are border routers for AS1, namely they are the routers that contain routing tables for routers outside AS1. If routers external to AS1 have not been configured to operate as SRs, then the query message/reply process stops at SR 14–17; however, if the public network routers are configured to act as SRs then the query message/reply process may continue until the SR closest to the ingress point of TP1 is reached. When the SR closest to the ingress point is found, it can be instructed to disconnect the link used by the intruder or it can be instructed to drop packets originating from the intruder's Internet Protocol (IP) address on a particular link, or based on other identifying information.

Still referring to FIG. 2 and the route taken by MP1, if the routers making up PN1 are not participating as SRs, then SR15 would be instructed to exclude TPs. SR15 excludes a TP, present at an input port, by preventing it from passing to an output port. In contrast, if the routers making up PN1 were participating as SRs then R6 could be instructed to exclude TPs present at its input port.

The process used to perform source path isolation in FIG. 2 is referred to as an inward-out technique. After being triggered by an IDS, an inward-out technique begins its queries from a generally central portion of an AS. The inward-out technique then employs QMs that hop outward from the central portion of the AS toward the border routers comprised therein.

Figure 3:
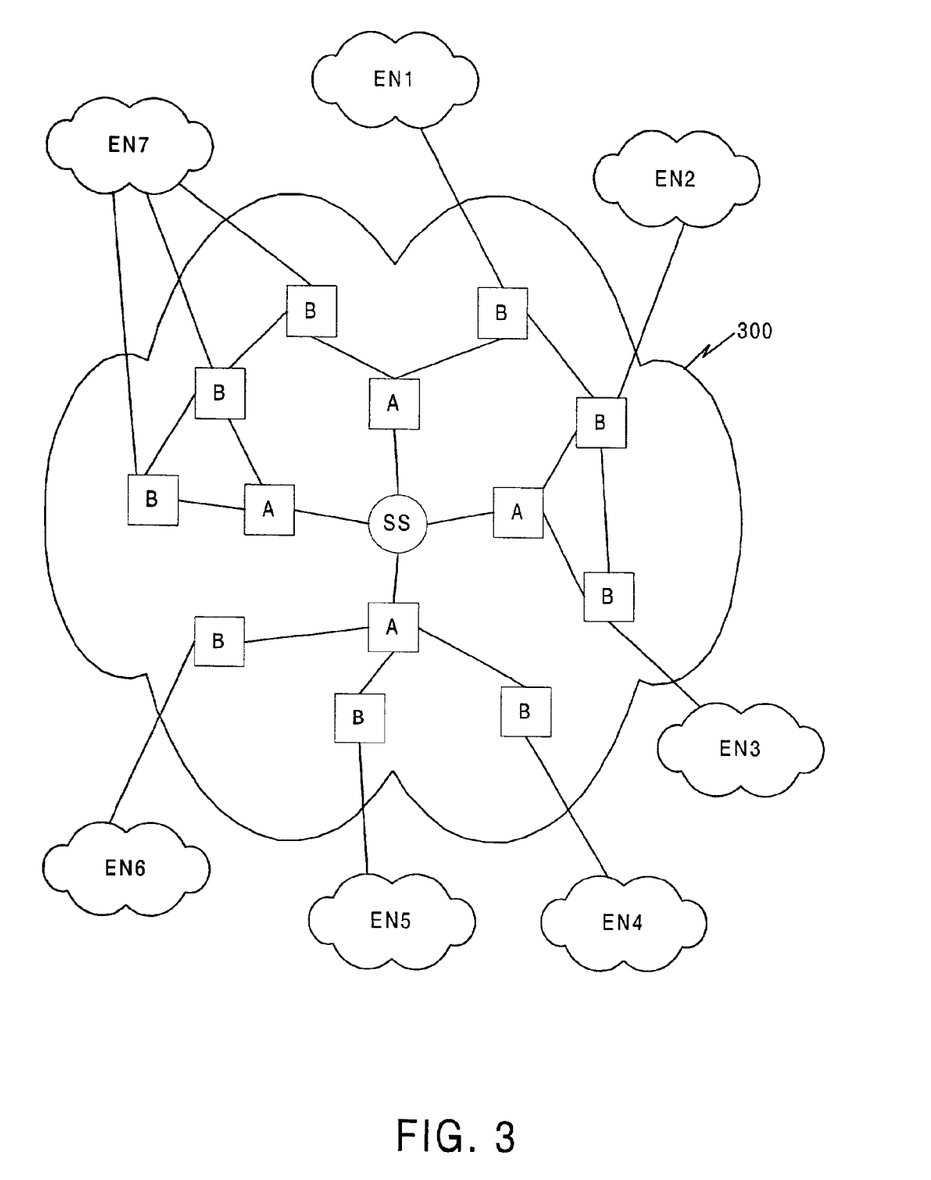
FIG. 3 is a schematic diagram of an autonomous system coupled to a plurality of external networks.

FIG. 3

FIG. 3 illustrates an autonomous system (AS), 300, employing border routers denoted generally as B connected to external networks EN1–EN7, other routers within 300 connected to the border routers generally denoted as A, and a source path isolation server denoted as SS. AS 300 may also include additional routers (not shown) located between SS and border routers B. An inward-out solution begins with SS at the center of FIG. 3 and works outward one hop at a time until the border routers, B, are reached. For FIG. 3, the routers labeled A are queried on the first hop and the border routers, B, are queried on a second, or subsequent, hop. Since the locations of border routers are known within AS 300, an outward-in solution may also be employed. With an outward-in solution, SS first queries the border routers, B, and they in turn query the routers labeled A. As can be seen from FIG. 3, an outward-in solution gets progressively closer to the center of AS 300. The disclosed technique can be used on networks containing virtually any number of participating routers. While inward-out and outward-in techniques have been herein described, the disclosed techniques are not limited to any particular types of solution or localization algorithms. Furthermore, SS may send queries to participating routers located virtually anywhere in the network so that many types of source path isolation techniques can be employed. Thus it can be seen that the disclosed technique is very scalable and flexible.

Further detail of the operation of a source path isolation server (SS) and a source path isolation router (SR) are provided hereinbelow.

Figure 4:
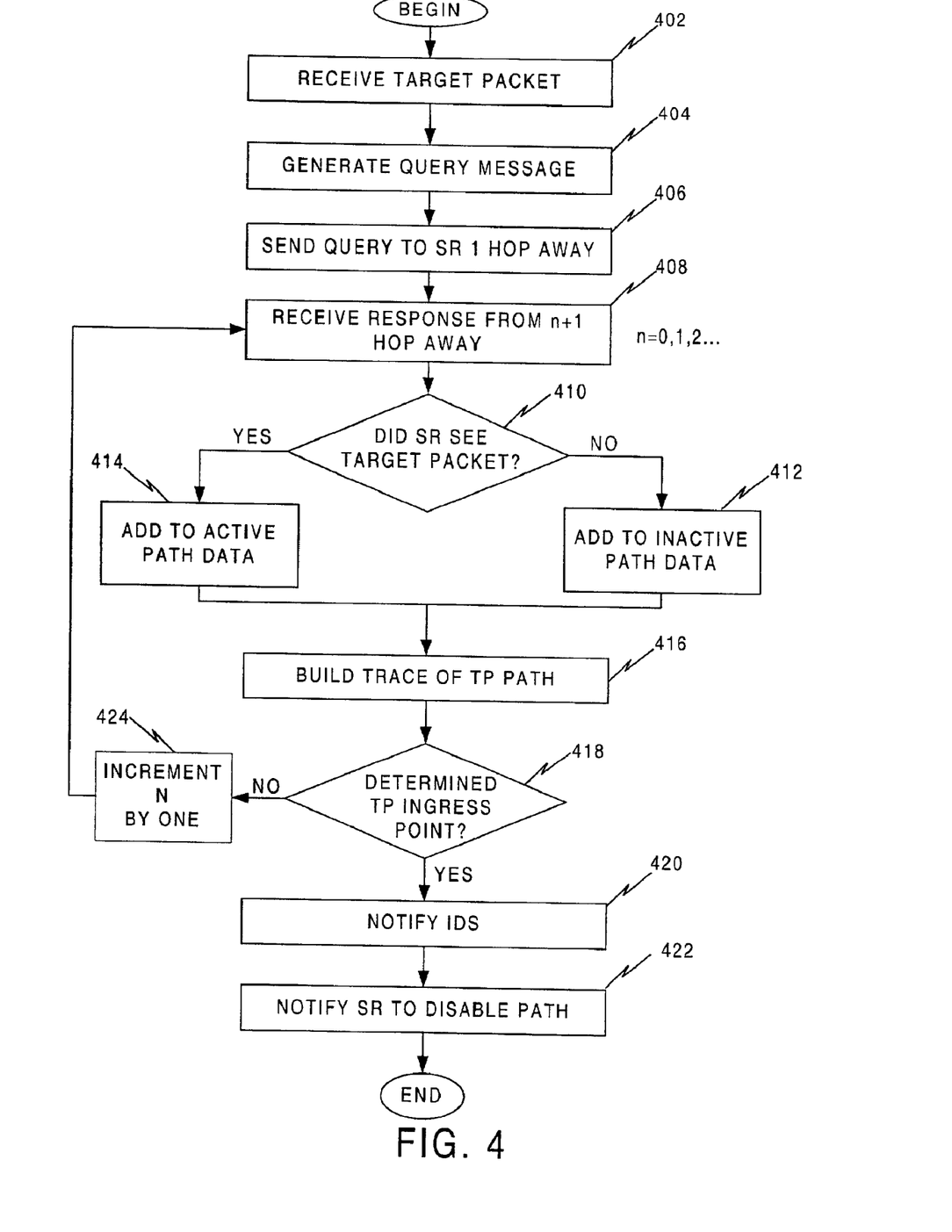
FIG. 4 is a flowchart illustrating an exemplary method for use with a source path isolation server.

FIG. 4

EXEMPLARY METHOD FOR SOURCE PATH ISOLATION SERVER

FIG. 4 illustrates an exemplary method for accomplishing source path isolation. The method begins when SS1 receives TP1 from IDS1 operating within AS1 (step 402).

After receiving TP1, SS1 may generate QM1 comprising TP1 and any additional information desirable for facilitating communication with participating routers (SRs) (step 404). Examples of additional information that may be included in QM1 are, but are not limited to, destination addresses for participating routers, passwords required for querying a router, encryption keying information, time-to-live (TTL) fields, a hash digest of TP1, information for reconfiguring routers, and the like. SS1 may then send QM1 to SRs located at least one hop away (step 406). SR may then process QM1 by hashing TP1 contained therein and comparing the resulting value to hash values stored in local memory, where the stored hash values identify packets having previously passed through SR.

After processing QM1, an SR may send a reply to SS1 (step 408). The response may indicate that a queried router has seen TP1, or alternatively, that it has not (step 410). It is important to observe that the two answers are not equal in their degree of certainty. If SR does not have a hash matching TP1, SR has definitively not seen TP1. However, if SR has a matching hash, then SR has seen TP1 or a packet that has the same hash as TP1. When two different packets, having different contents, hash to the same value it is referred to as a hash collision.

If a queried SR has seen TP1, a reply and identification (ID) information for the respective SR is associated as active path data (step 414). Alternatively, if an SR has not seen TP1, the reply is associated as inactive path data (step 412). Replies received from queried SRs are used to build a source path trace of possible paths taken by TP through the network using known methods (step 416). SS1 may then attempt to identify the ingress point for TP1 (step 418). If SS1 is unable to determine the ingress point of TP1, subsequent responses from participating routers located an additional hop away are processed by executing steps 408–418 again (step 424).

Examples of source path tracing techniques that may be employed with embodiments disclosed herein are, but are not limited to, a breadth-first search or a depth-first search. In a breadth-first search, all SRs in an area are queried to determine which SRs may have observed a target packet. Then, one or more graphs, containing nodes, are generated from the responses received by SS1. Where the nodes indicate locations that TP1 may have passed. Any graphs containing a node where TP1 was observed are associated as active, or candidate, paths, i.e. paths that TP1 may have traversed. With a depth-first search, only SRs adjacent to a location where TP1 was observed are queried. SRs issuing a positive reply are treated as starting points for candidate graphs because they have observed TP1. Next, all SRs adjacent to those that responded with a positive reply are queried. The process of moving the query/response process out one hop at a time is referred to as a round. This process is repeated until all participating routers have been queried or all SRs in a round respond with a negative reply indicating that they have not observed TP1. When a negative reply is received, it is associated as inactive path data.

When SS1 has determined an ingress point for TP1, it may send a message to IDS1 indicating that a solution has been found (step 420). Often it will be desirable to have the participating router closest to the ingress point close off the ingress path used by TP1. As such, SS1 may send a message to the respective participating router instructing it to close off the ingress path using known techniques (step 422). SS1 may also archive path solutions, data sent, data received, and the like either locally or remotely. Furthermore, SS1 may communicate information about source path isolation attempts to devices at remote locations coupled to a network. For example, SS1 may communicate information to a network operations center (NOC), a redundant source path isolation server, or to a data analysis facility for post processing.

Here it is noted that as SS1 attempts to build a trace of the path taken by TP1, multiple paths may emerge as a result of hash collisions occurring in participating routers. When collisions occur, they act as false positives in the sense that SS1 interprets the collision as an indication that a desired TP1 has been observed. Fortunately the occurrences of hash collisions can be mitigated. One mechanism for reducing hash collisions is to compute large hash values over the packets since the chances of collisions rise as the number of bits comprising the hash value decreases. Another mechanism for reducing collisions is to control the density of the hash tables in the memories of participating routers. That is, rather than computing a single hash value and setting a single bit for an observed packet, a plurality of hash values are computed for each observed packet using several unique hash functions. This produces a corresponding number of unique hash values for each observed packet. While this approach fills the router's hash table at a faster rate, the reduction in the number of hash collisions makes the tradeoff worthwhile in many instances.

Figure 5:
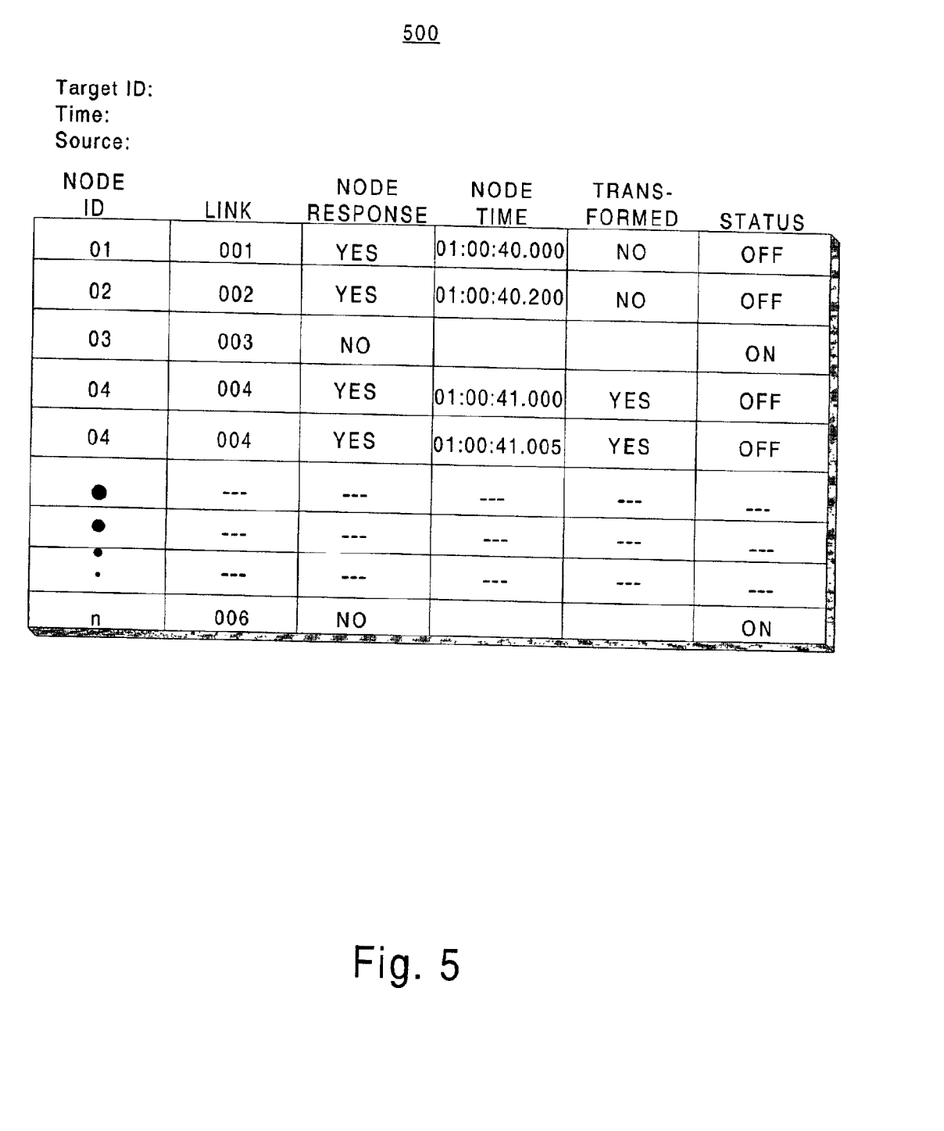
FIG. 5 is a schematic diagram of an exemplary data structure for storing information in a source path isolation server for use in performing source path isolation techniques.

FIG. 5

EXEMPLARY DATA STRUCTURE FOR STORING TRACE INFORMATION

FIG. 5 illustrates an exemplary data structure 500 stored in a database (not shown) in a memory on a source path isolation server. Data structure 500 stores information used in conjunction with performing source path isolation of a target packet. While FIG. 5 illustrates one data structure, it will be obvious to those skilled in the relevant arts that a plurality of data structures may be employed and that the data structures may include additional parameters and take on different forms from those of the exemplary data structure discussed herein.

Data structure 500 is comprised of a record R(1) containing attributes, or parameters, having data associated therewith. In the upper left portion of FIG. 5 are three parameters associated with the entire record R(1), namely a target packet attribute, shown as Target ID, a time attribute, shown as Time, and a source attribute, shown as Source. These attributes together serve as a handle for R(1) to facilitate storage into, and recall from, a machine-readable memory (not shown). Here Target ID is associated with unique information associated with a particular target packet (TP) received from a detection device such as an IDS or firewall. Time may be used to identify either the time at which TP was received at an SS, the time that TP was received at a detection device, or the time that R(1) was opened. Source may be used to identify the link that TP was detected on by the detection device, or alternatively, source may be used to uniquely identify the detection device that forwarded TP to SS.

Within 500 are exemplary column headings indicating still other attributes that may be used to facilitate source path isolation of TP. For example, a network component identification attribute, shown as node D, may be used to identify particular nodes, such as routers, switches, bridges, or the like, within a network that have been queried by SS. Link may be used to identify the particular link on which TP was observed. A reply packet attribute, shown as Node Response, may be used to indicate if a queried node has observed TP. Node time may indicate the time, preferably using some common reference, at which a respective node observed TP. Time is useful for assessing how long TP has been in the network and for performing comparisons with fields such as time-to-live (TTL). The attribute Transformed is used to track variants of TP in the event it has undergone a transformation. If TP has been transformed, it may be useful to have multiple entries associated the respective TP. For example in FIG. 5, node 04 has two entries for tracing an untransformed and a transformed version of TP. Status may be used to monitor network links associated with queried nodes. For example, a status of "ON" may indicate that a link is still active, i.e. carrying data traffic, while a status of "OFF" may indicate that a link has been disabled to exclude data traffic.

FIG. 5 illustrates one exemplary embodiment of a data structure that may be used for facilitating source path isolation; however, variations of the data structure format and number of records may be readily employed without departing from the spirit of the invention. For example, the terms "YES/NO" and "ON/OFF" used in conjunction with node response, transformed, and status may be desirable when conveying information to an operator; however, flags such as 1 or 0 may also be used to indicate the status of various attributes. In addition, a plurality of records may be generated when performing source path isolation. Additionally, other column entries may be used in conjunction with, or in place of, those shown in FIG. 5. For example, it may be desirable to associate the hash value, or alternatively, the contents of TP with each record. It may also be desirable to have a record associated with each target packet encountered or, alternatively, with each detection device employed within a network. And, it may be desirable to have still other data structures or records associated with source path solutions that have been generated in response to detected TPs.

Figure 6:
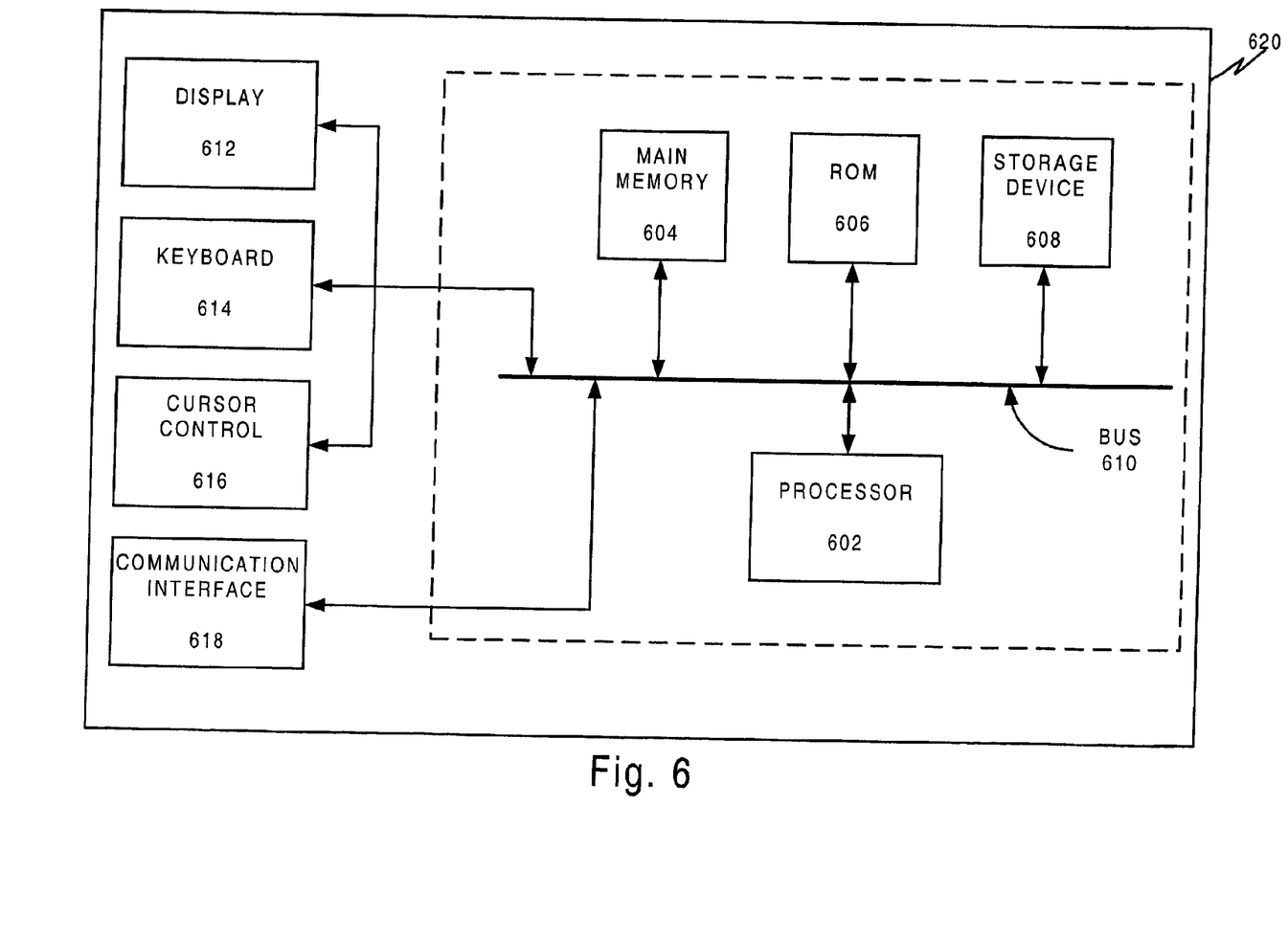
FIG. 6 is a block diagram of a general-purpose computer configurable for practicing exemplary embodiments or the invention.

FIG. 6

EXEMPLARY SYSTEM FOR PERFORMING METHOD

FIG. 6 illustrates a system 620 comprising a general-purpose computer that can be configured to practice disclosed embodiments. System 620 executes machine-readable code to perform the methods heretofore disclosed and includes a processor 602, main memory 604, read only memory (ROM) 606, storage device 608, bus 610, display 612, keyboard 614, cursor control 616, and communication interface 618.

Processor 602 may be any type of conventional processing device that interprets and executes instructions. Main memory 604 may be a random access memory (RAM) or a similar dynamic storage device. Main memory 604 stores information and instructions to be executed by processor 602. Main memory 604 may also be used for storing temporary variables or other intermediate information during execution of instructions by processor 602. ROM 606 stores static information and instructions for processor 602. It will be appreciated that ROM 606 may be replaced with some other type of static storage device. Storage device 608, also referred to as data storage device, may include any type of magnetic or optical media and their corresponding interfaces and operational hardware. Storage device 608 stores information and instructions for use by processor 602. Bus 610 includes a set of hardware lines (conductors, optical fibers, or the like) that allow for data transfer among the components of system 620.

Display device 612 may be a cathode ray tube (CRT), liquid crystal display (LCD) or the like, for displaying information in an operator or machine-readable form. Keyboard 614 and cursor control 616 allow the operator to interact with system 620. Cursor control 616 may be, for example, a mouse. In an alternative configuration, keyboard 614 and cursor control 616 can be replaced with a microphone and voice recognition means to enable an operator or machine to interact with system 620.

Communication interface 618 enables system 620 to communicate with other devices/systems via any communications medium. For example, communication interface 618 may be a modem, an Ethernet interface to a LAN, an interface to the Internet, a printer interface, etc. Alternatively, communication interface 618 can be any other interface that enables communication between system 620 and other devices, systems or networks. Communication interface 618 can be used in lieu of keyboard 614 and cursor control 616 to facilitate operator or machine remote control and communication with system 620.

As will be described in detail below, system 620 may provide SS1 operating within AS1 with the ability to perform source path isolation for a given TP. SS1 may receive MP1 from IDS1 and generate QM1 in response to processor 602 executing sequences of instructions contained in, for example, memory 604. Such instructions may be read into memory 604 from another computer-readable medium, such as storage device 608, or from another device coupled to bus 610 or coupled via communication interface 618. Execution of sequences of instructions contained in memory 604 causes processor 602 to perform the method described in conjunction with FIG. 4. For example, processor 602 may execute instructions to perform the functions of receiving a target packet (step 402), receiving replies from queried routers (step 408), and building a trace of the path traveled by TP (step 416). Alternatively, hard-wired circuitry may be used in place of or in combination with software instructions to implement the functions of SS1. Thus, the disclosed embodiments of SS1 are not limited to any specific combination of hardware circuitry and software. For example, the functionality may be implemented in an application specific integrated circuit (ASIC), a field-programmable gate array (FPGA), or the like, either alone or in combination with other devices to provide desired functionality.

CONCLUSION

As can be seen, the disclosed embodiments provide the functionality necessary to facilitate source path isolation of malicious packets in a network. While the preceding disclosure is directed to an Internet Protocol (IP) network, disclosed embodiments can be used in conjunction with other network protocols such as frame relay, asynchronous transfer mode (ATM), synchronous optical network (SONET), and the like. In addition, disclosed embodiments may be adapted to operate within different layers of a network such as the data link layer, network layer, transport layer or the like. Furthermore, the disclosed embodiments are not limited to particular network topologies or architectures.

Furthermore the disclosed methods for implementing a source path isolation server (SS) are not limited to a single programming language or hardware architecture. For example, software for performing the functions of SS may be implemented in a high level programming language such as C, C++, LISP, or the like. Alternatively, software may be implemented in a lower level language such as assembly language, or a device specific language, where requirements such as speed must be met. Furthermore, SS may be configured to communicate with, and make information available to, other devices operatively connected to a network using known programming languages and techniques. For example, it may be desirable to have SS make source path isolation solutions available to an operator responsible for monitoring network security. In addition, SS can be implemented in a distributed fashion either by employing multiple processors or by having various components physically separated and coupled by a communication means such as a distributed bus, network, or the like. Also, it may be desirable to have SS communicate with one or more SRs over a dedicated network instead of using the network carrying data traffic among the SRs. For example, using a dedicated network may provide additional security, reliable bandwidth, or communication redundancy in the event that one or more links to an SR is disabled.

Query messages (QMs) and replies are not limited to a single network protocol or packet type. In many instances, it will be desirable to have QMs and replies transported using readily known protocols; however, customized protocols and message types can be used. For example, it may be desirable to employ a smart packet for sending QMs to participating routers. A smart packet is one that may contain a standard message, such as the data from a target packet, along with machine-readable instructions for instructing a receiving device, such as an SR, to modify its operation in response to the contents of the executable instructions contained therein. Smart packets facilitate rapid responses to network intrusions by allowing an SR to modify operation soon after receiving a QM from as SS, or a forwarded QM from a participating router.

Furthermore, the disclosed methods can operate on encapsulated data such as would be encountered if network data were encrypted, converted from one network protocol to another, or a packet was split for transmission over more than one link. As can be seen, many variations of the disclosed embodiments are possible without departing from the spirit of the invention.

Therefore, the present embodiments are to be considered in all respects as illustrative and not restrictive, the scope of the invention being indicated by the appended claims rather than by the foregoing description, and all changes within the meaning and range of equivalency of the claims are therefore intended to be embraced therein.

What is claimed is:

1. In a network including a plurality of hosts and a plurality of routers for facilitating the transmission of packets, a system for determining the point of entry of a malicious packet into said network using a representation of said malicious packet, said system comprising:
   an intrusion detection system for detecting entry of said malicious packet into said network; and
   a source-path isolation server responsive to operation of said intrusion detection system, for isolating said malicious packet;
   whereby said point of entry of said malicious packet is determined.

2. The system of claim 1 and wherein said source-path isolation server further comprises:
   means for generating a query message containing identification information about said malicious packet; and
   means for forwarding said query message to certain of said plurality of routers displaced one hop away from said server.

3. The system of claim 2 and wherein said certain of said plurality of routers comprises:
   means for generating a hash value of said identification information;
   means for establishing a bit map of hash values representative of those of said packets which are transmitted through said certain of said plurality of routers; and
   means for comparing said hash value against said hash values.

4. The system of claim 3 and wherein said certain of said routers further comprises:
   means responsive to operation of said comparing means determining no match between said hash value and said hash values, for notifying said server that said malicious packet was not transmitted through said certain of said routers; and
   means responsive to operation of said comparing means determining a match between said hash value and at least one of said hash values for notifying said server that said malicious packet was transmitted through said certain of said routers and for forwarding said query message to other of said plurality of routers displaced one hop from said certain of said plurality of routers;
   whereby determination of said point of entry of said malicious packet is pursued on a hop-by-hop basis.

5. In a network carrying a plurality of packets at least one of said packets being a target packet, said network including at least one network component, a detection device and a server, a method for determining a point of entry of a target packet into said network, said method comprising:
   at said server, receiving said target packet from said detection device;
   sending a query message identifying said target packet to a first component of said at least one network component;
   receiving a reply containing information about said target packet from said first component;
   processing said reply to extract said information; and
   using said information in a manner that said point of entry shall ultimately be determined.

6. The method of claim 5 and wherein said detection device is incorporated into said server.

7. The method of claim 5 and wherein said network further includes a host, said host including capability for placing packets onto said network.

8. The method of claim 5 and wherein said sending operates to include said target packet into said query message.

9. The method of claim 5 and wherein said query message comprises a representation of said target packet.

10. The method of claim 9 and wherein said representation is a hash of at least a portion of said target packet.

11. The method of claim 5 and wherein said one of said at least one network component is located one hop away from said server.

12. The method of claim 5 and wherein said one of said at least one network component is located more than one hop away from said server.

13. The method of claim 5 and wherein said first component forwards said reply to another of said at least one network component.

14. The method of claim 5 and wherein said first component is a router.

15. The method of claim 5 and wherein said information is hash information derived from hashing at least a portion of said query message to obtain a query hash value and using said query hash value to determine if said target packet has passed through said first component.

16. The method of claim 5 and wherein said determining is accomplished using a source path isolation technique.

17. The method of claim 16 and wherein said source path isolation technique includes a breadth-first search.

18. The method of claim 16 and wherein said source path isolation technique includes a depth-first search.

19. In a network carrying a plurality of packets, said plurality of packets including a target packet having entered through an intrusion location, a query packet, and a reply packet generated in response to said query packet, said network including a network component having a first memory and a server having a second memory, said server comprising:
   a bus communicatively coupled to said network;
   said second memory communicatively coupled to said bus for storing data and machine-readable instructions; and
   a processor communicatively coupled to said bus executing said machine-readable instructions for causing said server to place a query packet onto said network for transmission to said network component, said query packet being generated in response to detecting said target packet and further including information about said target packet, said processor further executing said machine-readable instructions to process said reply packet to identify said intrusion location.

20. The server of claim 19 and wherein detecting a target packet is accomplished by processing a notification packet received from said network.

21. The server of claim 19 and wherein said reply packet is generated in response to said network component comparing a first hash value of at least one of said plurality of packets to second hash value derived from at least a portion of said query packet.

22. The server of claim 21 and wherein said first hash value is stored in said first memory using a bit mapped array.

23. The server of claim 19 and wherein said reply packet is generated in response to said network component comparing a first representation of at least one of said plurality of packets to second representation derived from at least a portion of said query packet.

24. The server of claim 23 and wherein said first representation is stored in said first memory using a bit mapped array.

25. A communication medium for transporting data in a network, said network including a network component for generating a representation of an intruding packet, a server, and an intrusion detection device, said communication medium comprising:

media for carrying a query message comprising information about at least a portion of said intruding packet, said query message being created by said server in response to a triggering event indicating said intruding packet was detected by said intrusion detection device; and media for carrying a reply generated by said network component in response to said query message, said network component matching said representation to said information in said query message and indicating a match therebetween;

whereby said match indicates said intruding packet has been encountered.

26. The communication medium of claim 25 and wherein said media for carrying a query message and said media for carrying a reply are a single media carrying said query message and said reply.

27. The communication medium of claim 25 and wherein said representation is a hash value.

28. In a network carrying a plurality of packets, a computer-readable data signal embodied in a transmission medium used to identify an intrusion location of a target packet, said network including a server and a network component having memory storing a like plurality of packet representations, each of said representations corresponding respectively to each one of said plurality of packets, said data signal comprising:

a header portion comprising an address of said network component; and a body portion comprising at least a portion of said target packet, said body portion being compared to each of said packet representations wherein a match between said at least a portion of said target packet and one said packet representations indicates said network component encountered said target packet.

29. The data signal of claim 28 wherein said body portion further includes machine-readable instructions for causing said network component to modify its operation upon execution of said instructions.

30. In a network carrying a plurality of packets, said plurality of packets including a target packet having entered said network through an intrusion location, a computer-readable storage medium containing executable code for instructing a processor to generate a query in response to a triggering event, said network including a network component having memory storing representations of encountered packets, said executable code instructing said processor to perform operations comprising:

processing said triggering event to extract said first information about said target packet;

generating said query for placement onto said network, said query including second information about at least a portion of said target packet;

sending said query to said network component;

receiving a reply from said network component;

processing said reply; and using said reply to facilitate identification of said intrusion location.

31. The computer-readable storage medium of claim 30 and wherein said reply is generated in response to comparing said second information to said representations.

32. The computer-readable storage medium of claim 30 and wherein said reply is generated only if said network component has observed said target packet.

33. The computer-readable storage medium of claim 30 and wherein said representations are generated by hashing at least one of said plurality of packets to produce a hash value and using said hash value as an index into said memory.

34. In a network carrying a plurality of packets, said network including a network component having memory storing first information about a subset of said plurality of packets having passed through said network component and a processor for computing a first representation of a target packet and a second representation of a member of said subset of said plurality of packets, said memory for also storing second information about an intrusion location of said target packet in said network, said memory comprising:

a data structure stored in said memory, said data structure including information resident in a database used by a source path isolation program for determining said intrusion location, said data structure including:

a network component identification attribute corresponding to location of said network component;

a target packet attribute uniquely identifying said target packet; and a reply packet attribute associated with all members of said subset including at least one of said member, said reply packet attribute being associated with said network component identification attribute to identify origin of said reply packet, said reply packet indicating said member was encountered if said first representation matches said second representation.

* * * * *